April 16, 1935.  J. ALBRECHT  1,997,564
APPARATUS FOR SEPARATING PLANT ROOTS FROM SOIL
Original Filed Jan. 8, 1931   3 Sheets-Sheet 1

INVENTOR
John Albrecht
BY Wheeler, Wheeler and Wheeler
ATTORNEYS

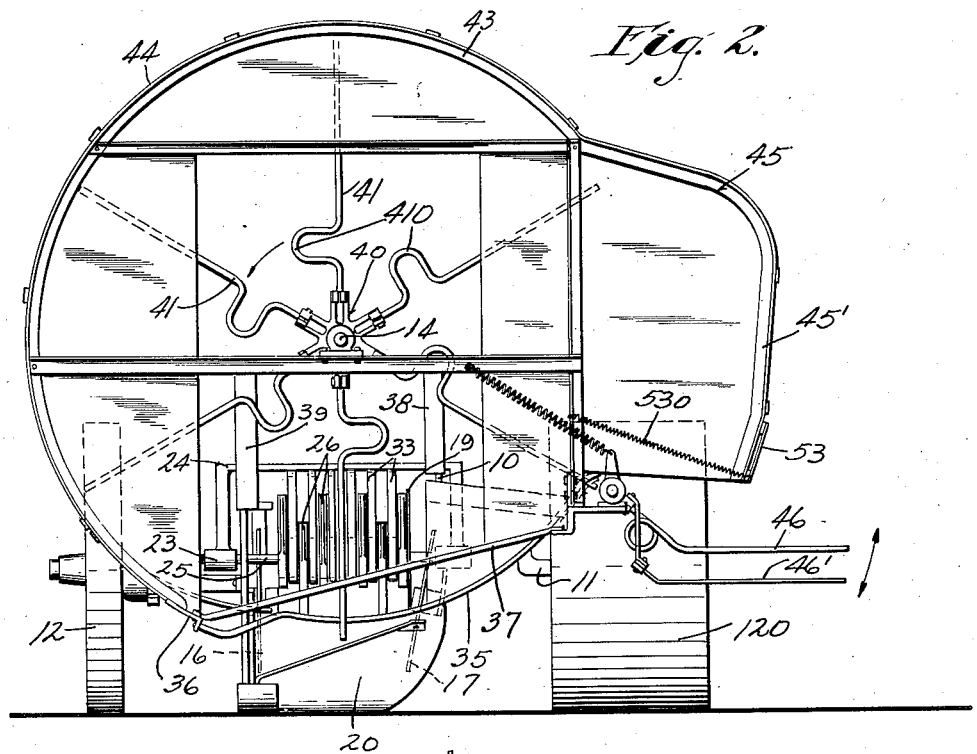
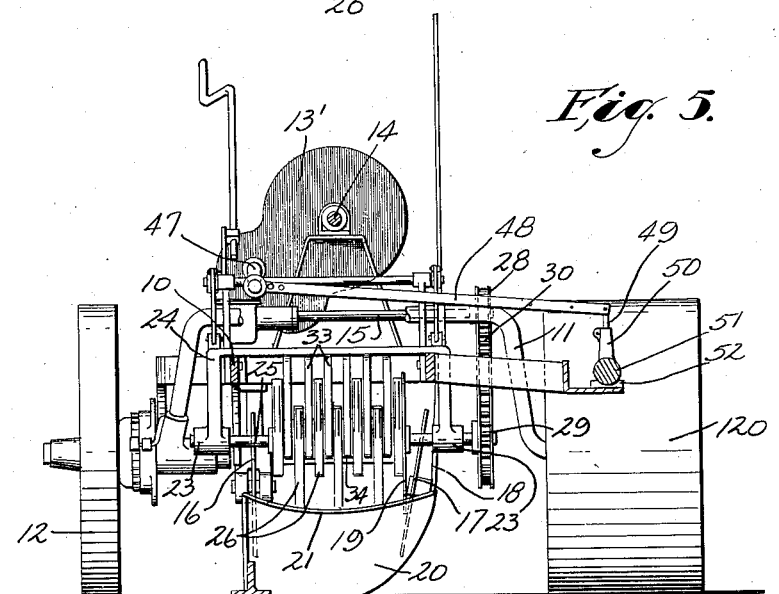

April 16, 1935.  J. ALBRECHT  1,997,564

APPARATUS FOR SEPARATING PLANT ROOTS FROM SOIL

Original Filed Jan. 8, 1931    3 Sheets-Sheet 3

INVENTOR
John Albrecht
BY Wheeler, Wheeler and Wheeler
ATTORNEYS

Patented Apr. 16, 1935

1,997,564

UNITED STATES PATENT OFFICE 1,997,564

APPARATUS FOR SEPARATING PLANT ROOTS FROM SOIL

John Albrecht, Kewaunee, Wis.

Original application January 8, 1931, Serial No. 507,339. Patent No. 1,935,199, dated November 14, 1933. Divided and this application October 20, 1933, Serial No. 694,390

14 Claims. (Cl. 97—10)

This invention relates to improvements in apparatus for separating plant roots from soil. The present application is a division of my application filed January 8, 1931, Serial No. 507,339 and entitled "Process for freeing soil from weeds", and upon which Patent 1,935,199 issued November 14, 1933.

Broadly speaking, it is the object of the present invention to provide novel and improved apparatus for effecting a complete separation of plant roots from the soil in which they are growing, with particular reference to heavy fibrous roots such as those of quack grass.

Specifically, it is my purpose to provide a machine with which the roots may be dug up with the earth in which they are growing and projected unsupported through space, and flailed or struck with substantial impact in a transverse direction while in motion unsupported through space.

It is my further purpose to avoid injury to the machine mechanism which performs this flailing operation, to provide against the escape of roots, to prevent entanglement of the roots or other portions of the plants with the apparatus, to effect a complete separation and discharge of all earth and stones from the roots, and to prepare and harden the soil upon which the roots are to be discharged so as to minimize the possibility of any root becoming covered in a position for growth.

In the drawings:

Figure 2 is a rear elevation of such apparatus.

Figure 5 is a detail view taken in cross section through the apparatus in the plane indicated at 5—5 in Figure 1.

Like parts are identified by the same reference characters throughout the several views.

Figure 1:
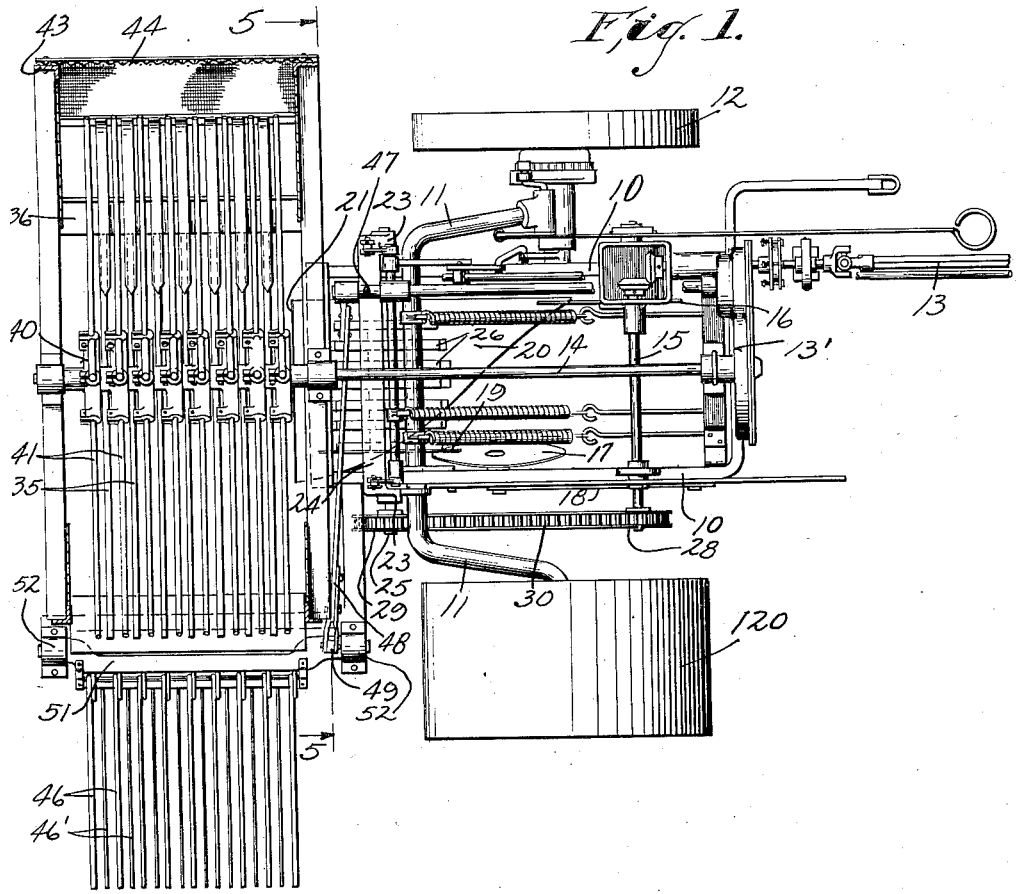
Figure 1 is a plan view of apparatus embodying the invention.
Figure 4:
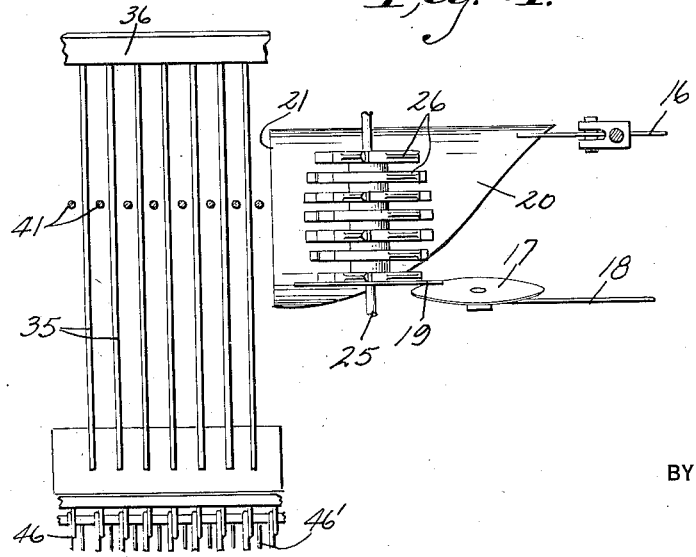
Figure 4 is a diagrammatic plan view of portions of the apparatus, other portions being shown in cross section.

The general organization of the apparatus herein disclosed is very similar to that illustrated in the parent application above identified. The machine has, however, been rendered somewhat more compact and various improvements and refinements are illustrated in the present drawings.

The frame 10 is supported by axle 11 and wheel 12 and roller 120. It is adapted to be drawn by a tractor and is provided with a drive shaft 13 arranged to receive power from the tractor and to deliver such power through a gear transmission 13' to reel shaft 14 and jack shaft 15. In practice the jack shaft operates at about 150 R. P. M., and it has been found advantageous to operate the reel shaft at about 100 R. P. M.

Carried by frame 10 is a plow 20 of the digging or so-called shovel type. The upper margin 21 of the plow is slightly concave as shown in Fig. 5.

The coulter 16 on the land side of the plow blade assists in demarcating the unbroken ground from that which is about to be lifted by the plow. In addition to this conventional coulter, a second inclined coulter 17 is carried by an arm 18 in a position to ensure the passage under the beating teeth hereinafter to be described, of all of the roots and material elevated by the plow. A third blade 19 is mounted on the shaft 25 which carries the aforesaid teeth in order to prevent the escape of the roots.

Pivoted to the main frame 10 is a sub-frame comprising arms 22, bearings 23, and yoke 24 which spans the main frame.

Figure 6:
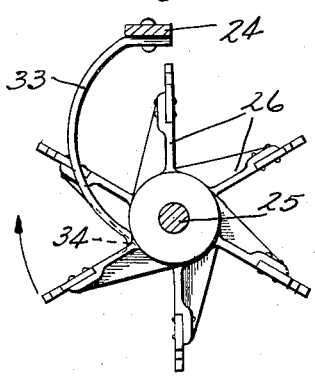
Figure 6 is a detail view in side elevation, of the mechanism for projecting the mass of earth and roots rearwardly preliminary to the separation of the roots.

Journaled in the bearings 23 is a shaft 25 carrying successive sets of blades 26 which break up the material and project it rearwardly, unsupported, through space, from the top of the plow. These blades are arranged in sets of three upon hubs mounted on a shaft, as shown in Figs. 5 and 6, successive hubs being offset 60 degrees so that the blades of successive sets are staggered. Jack shaft 15 and shaft 25 are provided with sprockets 28 and 29 over which operates a chain 30 to drive the shaft 25 at a speed which may conveniently approximate 250 R. P. M. It will be noted that the teeth 26 near the center of shaft 25 are slightly longer than the teeth of the ends thereof so as to conform closely to the upper margin of the plow 20. The direction of shaft rotation is shown by an arrow in Fig. 6.

The rapid rearward motion of the pulverizing teeth 26 across the upper end of the plow share tends to disintegrate clods of earth and masses of roots passing over the upper end of the plow. Furthermore, the rapidity of rotation of teeth 26 is such that the entire mass of material lifted by the plow is projected rearwardly from the plow and passes in a stream substantially horizontally from the rear and upper margin thereof.

The roots would tend to become tangled upon the teeth 26 if it were not for the provision of guard fingers 33 which are connected with yoke 24 and interposed between each set of teeth 26.

The terminal portion of each finger is bent to lie as shown at 34 upon the ring-like spacers which separate the tooth carrying members on shaft 25. The fingers 33 so far fill the space between the tooth carrying members that any roots tending to catch upon a given tooth are sheared off in passing the adjacent fingers 33. It is found that the use of such fingers prevents any tangling of roots upon the cultivator, whereas without the fingers frequent stops to disengage roots from the cultivator are commonly necessary.

As the stream of material raised by the plow is projected rearwardly by the rapid rotation of the cultivator teeth 26, it passes above a set of flexible supporting bars 35. These are anchored at one end only, in bracket 36 which is a part of a screen enclosed sub-frame 43 of generally cylindrical form held by means of uprights 38 and 39 to the plow frame 10. The screening terminates at the lower side of this frame to provide an opening as shown in Fig. 2, across which the sides of the frame are connected by a brace rod 37. Bars 35 are curved in general concentricity with the reel shaft 14, and the ends of the bars remote from bracket 36 are left free to facilitate the yielding of the bars in the event that a stone becomes caught therebetween.

A further important advantage in the absence of supports for the free ends of bars 35 consists in the fact that any supports used for the free ends of these bars would tend to become encumbered with roots of some weeds such as quack grass, which has a particularly strong, tough root.

The stream of material lifted by the plow would pass completely across the set of prongs 35 if it were not for the operation of the reel 40 which is mounted on shaft 14 and preferably includes six or more sets 41 of radially extending rods. The number of sets required will depend to some degree upon the rate of rotation of the reel shaft 14, and should be so proportioned to that rate of rotation and the axial extent of the reel that no material delivered from the plow will be able to fall out of the path of the reel before being struck, while in mid air, by the rods of one of the sets 41. Each of the rods is preferably several feet in length, and at the indicated rate of rotation these rods strike the stream of material with considerable impact, which is ordinarily sufficient to break up any lumps of earth and any tangle of roots. The operation of the rods 41 is particularly effective in disengaging the roots from the earth because of the fact that the earth and roots are in mid air at the time they are struck by the rods, and hence are free to yield in the direction of the impact.

This operation may be regarded as a flailing process in which the material flailed has no resistance other than its own inertia. The material comprises a mass of roots and soil already broken up by the cultivating teeth. By the term "flailing" I mean an operation in which the material gets a series of very hard swift impacts, such as would reduce potatoes, beets, and other root vegetables to a pulp and which does completely disintegrate even a very hard soil without, however, materially disrupting the tough fibers of wood roots which the apparatus and process are specifically designed to separate from the soil.

I regard as important the facts that the material is in mid air when flailed, that by the flailing the direction taken by the roots and other fibrous matter caught upon the flailing rods is abruptly changed from the direction taken by the rearwardly and downwardly falling disintegrated earth, and that the action of the flailing rods is such as to deliver the weed roots at one side of the path of the machine where they are discharged entirely separately from the earth and cannot be recovered thereby.

Most of the material struck by rods 41 will be hurled thereby in a direction transverse to the path of travel of the machine. This direction will be toward the right as the machine is viewed in Fig. 2. The direction of the impact against some of the material, however, will have a downward inclination and the material thrown downwardly will be supported by the bars 35 across which the rods will rake the material to force stones and loose earth through the bars while hurling the roots and any remaining particles of earth laterally and upwardly.

The screen cloth 44, which covers the side and top portions of frame 43, is preferably made of one or more plies of heavy canvas to minimize the possibility of danger from stones which may be struck at such an angle that they would otherwise be thrown free of the machine.

From the discharge side of frame 43 projects an auxiliary frame 45 about which the heavy canvas screen cloth is also extended. The vertical sides 45' thereof constitute a baffle in the path of material held laterally by the revolving wheel 41. Dirt, roots, and stones strike this baffle with such force that the last remaining particles of earth are pulverized. The lowermost flap of the canvas screen cloth is free of the frame and reinforced as shown at 52 in Fig. 2 to comprise a door held shut by a light tension spring 530 so as to be yieldable in the event that this flap is struck by a heavy stone.

Figure 3:
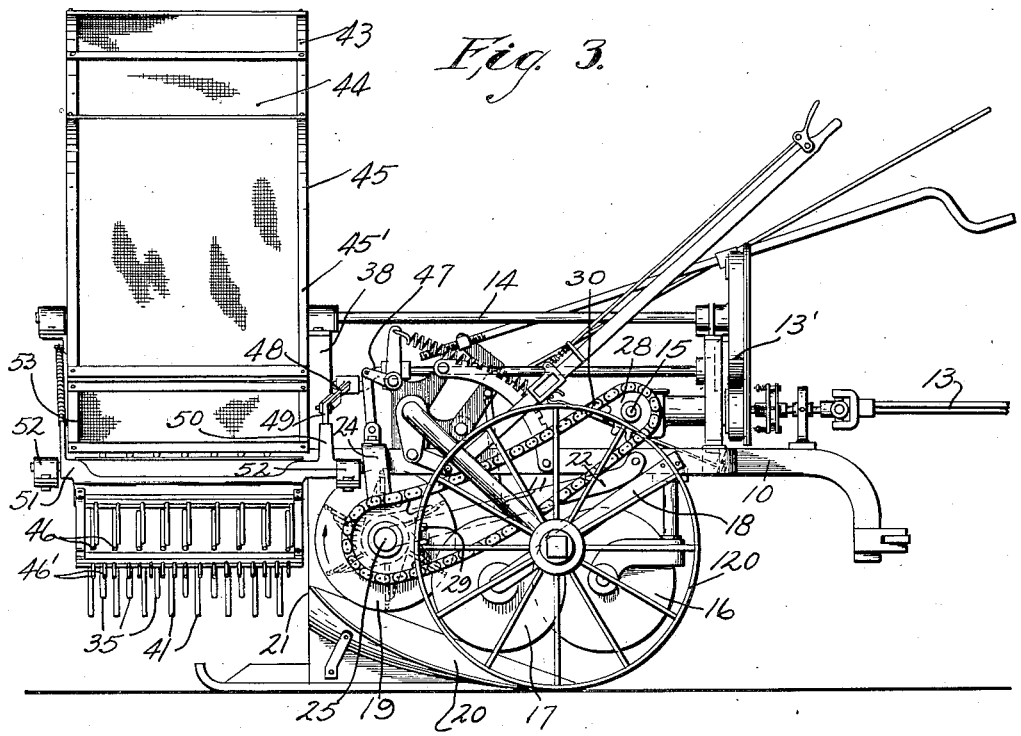
Figure 3 is a side elevation thereof.

All of the loose material striking the baffle wall 45' drops upon a riddle 46 and a sub-riddle 46', both of which are violently agitated by the actuating connection shown in Figs. 1, 3 and 5. This agitating mechanism includes a crank 47 extending backwardly from gear box 13', from which it is rotatively actuated. A connecting rod 48 connected with the crank 47 extends laterally to an extension link 49 receivable for adjustment in a tubular member 50 forming a crank-like extension for a supporting shaft 51 comprising a part of the main riddle 46. As indicated most clearly in Fig. 5, the supporting shaft 51 is journaled at 52 in supporting pillow blocks.

As stated above, the material reaching the riddle will consist of loose roots and free pulverized earth. During the violent agitation of the riddle the earth will drop through the riddle and the roots will gradually work off the free end of the riddle where they will fall fully exposed on top of the ground.

Obviously the passage of the machine will leave the soil in a highly cultivated condition and the smaller roots might lodge between small lumps of earth and recommence their growth if it were not for the fact that the roller 120 is made substantially the width of the furrow opened by the plow in each operation so that in a subsequent traverse of the field, the earth will be rolled flat and smooth before the roots are dumped from the riddles on to the ground. Upon the rolled ground there is very little opportunity for the roots to "catch" and grow. Thus substantially all plants which were in the soil at the time the machine passed over it, will be piled in windrows on previously rolled ground along the path followed by the riddles 46 and 46', with their roots fully exposed.

Several means are employed to prevent the accumulation of plants or roots upon any part of the machine. So far as the actuating teeth 26 are concerned, such accumulations are prevented by fingers 33, and so far as bars 35 are concerned such accumulations are prevented by the freedom of the ends of bars 35 toward which the reel operates. In the present machine an additional feature consists in a novel arrangement whereby the rods or arms 41 of the wheel 40 are each provided near the hub of the reel, with an offset or loop portion 410. This offset or loop not only eliminates crystallization by rendering the rods or arms more resilient but, moreover, it leaves such arms free for vibratory movement, which rapidly shakes from them any weed or root growths tending to accumulate thereon, and also seems to contribute materially toward the pulverization of lumps of earth with which the rods come in contact during the operation of the machine.

It is particularly to be noted that the bends 410 in the rods 41 extend in a forward direction with reference to the travel of such rods, so that if the rods encounter stones or other obstacles obstructing further movement, the bending of the rods at the loops shortens the effective radial length of the rod and enables it to pass any such obstruction without breakage or permanent distortion. The spring material of which these rods are made is substantially resilient to restore the rod to its normal form as soon as the obstruction is passed.

I attribute much of the success of the machine to the thorough pulverization of the material as it passes over the top margin of the plow and the subsequent impact of the reel on the material while it is in free air, unsupported and free to break or yield under the impact. Roots yield in most instances without breaking,—an important factor in dealing with roots whereof every joint will grow if covered with earth.

I claim:

1. In a device of the character described, the combination with earth elevating means including a plow, of a rotary cultivator adapted to act upon material elevated by said means, and a reel mounted for rotation transversely across the path of material discharged from said means, means carried by said reel for flailing such material, and means for operating said reel at a speed such that the impact of said flailing means is adapted to free the earth of plant matter.

2. In a device of the character described, the combination with a plow, of a cultivator provided with teeth rotatable rearwardly across the open margin of the plow and adapted to discharge behind the plow material acted upon thereby, a reel supported for rotation behind the plow upon an axis approximately longitudinal with reference to the path of plow movement, means for driving said reel to impact material discharged from the plow, and means for mechanically separating from the earth impacted by said reel the roots freed therefrom.

3. In a device of the character described, the combination with longitudinally movable soil elevating means, of a reel having a generally longitudinal axis and approximately radial flail rods rotatable transversely across the path of material elevated by said means, and a set of transverse bars positioned to receive such material and for the partial support of said material when it is acted upon by said flail rods in the course of its transverse movement under the impact of said rods.

4. In a machine of the character described, the combination with a plow and pulverizer, of flail means positioned to act transversely on material discharged by the pulverizer, a baffle in the path of said material, and a riddle adapted to catch material intercepted by the baffle, said riddle being provided with mechanism for agitating it.

5. A device of the character described comprising the combination with a lifting plow having a concave upper discharge margin, of a set of revolving teeth of such length as to be complementary to said margin, and means supporting said teeth for rotation about an axis above said margin in a direction such that the teeth move rearwardly across said margin, means for the rotation of said teeth at a speed sufficiently high to accelerate the discharge of material from the margin of the plow, a set of flail arms mounted for rotation about an axis parallel to and above the discharge of such material, whereby such flail arms move transversely across the path of the material, means for rotating said flail arms, and means for effecting the separation of roots from soil disintegrated by the impact of said arm.

6. In a device of the character described, the combination with means for discharging root containing material through space, of flail means including rods of resilient material mounted for vibratory movement, and means for moving the vibratory end portions of said rods transversely of the path of such material.

7. In a device of the character described, the combination with a flail hub mounted for rotation, and means for the rotation thereof, of resilient flail rods mounted in said hub and each provided near said hub with a bend adapted to facilitate the vibratory movement of the free end of the rod, and means for discharging material to be disintegrated transversely across the path of movement of the end portions of said rods whereby to be engaged by the vibratory portions thereof.

8. In a device of the character described, the combination with a series of supporting bars made fast at one end and free at the other, of a flail device including a hub, and flail rods mounted therein and provided with free end portions movable along said bars toward the free end thereof.

9. In a device of the character described, the combination with a series of supporting bars made fast at one end and free at the other, of a flail device including a hub, and flail rods mounted therein and provided with free end portions movable along said bars toward the free end thereof, certain of said rods having bent portions adjacent said hub whereby to facilitate vibratory movement of their respective free ends.

10. In a device of the character described, the combination with a series of supporting bars made fast at one end and free at the other, of a flail device including a hub, and flail rods mounted therein and provided with free end portions movable along said bars toward the free end thereof, certain of said rods having bent portions adjacent said hub whereby to facilitate vibratory movement of their respective free ends, together with means for discharging through space transversely of said bars and below said hub material to be disintegrated by said flail rods in the path of movement of the free ends thereof.

11. In a device of the character described, the combination with a series of supporting bars made fast at one end and free at the other, of a flail device including a hub, and flail rods mounted therein and provided with free end portions movable along said bars toward the free end thereof, certain of said rods having bent portions adjacent said hub whereby to facilitate vibratory movement of their respective free ends, together with means for discharging through space transversely of said bars and below said hub material to be disintegrated by said flail rods in the path of movement of the free ends thereof, together with a drum-shaped casing having flexible walls enclosing said flail device, said casing having an opening below said bars for the discharge of pulverous material and an opening at the free end of said bars for the discharge of fibrous material.

12. In a device of the character described, the combination with a series of supporting bars and means for discharging material thereacross, of a flail device operating rotatively and including flail rods having free ends adapted to sweep longitudinally of said bars across the path of said material, certain of said rods having bends intermediate their ends in a direction forwardly with respect to the direction of rotation of said flail device, whereby the flexing of such a rod upon encountering an obstacle will tend to shorten its effective length to enable it to clear said obstacle.

13. In a device of the character described, the combination with earth elevating means including a plow, of a frame provided with spaced wheels between which said plow is disposed, one of said wheels comprising an earth compacting roller, means for separating roots from the earth elevated by said plow and including a reel having a flailing portion rotatable transversely across the path of material discharged from said plow, and means disposed laterally of said reel for catching the roots discharged therefrom and for depositing said roots upon the earth compacted by said roller at one side of the path of movement of said plow.

14. In a device of the character described, the combination with a lifting plow and a frame therefor provided with wheels at each side of said plow, one of said wheels being sufficiently broad to comprise a roller adapted to compact earth disturbed by said plow in a previous traverse, means for disintegrating earth discharged from said plow to loosen said earth from the roots therein contained, means for delivering said roots laterally toward the line of travel of said roller, and means for intercepting said roots and discharging them upon the earth flattened by said roller at one side of the earth freshly discharged from said plow.

JOHN ALBRECHT.